(12) United States Patent
Takanami et al.

(10) Patent No.: US 7,592,070 B2
(45) Date of Patent: Sep. 22, 2009

(54) ADHESIVE SILICONE ELASTOMER SHEET

(75) Inventors: Akiko Takanami, Chiba (JP); Yoshito Ushio, Chiba (JP); Osamu Mitani, Chiba (JP); Masayuki Onishi, Chiba (JP)

(73) Assignee: Dow Corning Toray Company, Ltd., Tokyo (JP)

( * ) Notice: Subject to any disclaimer, the term of this patent is extended or adjusted under 35 U.S.C. 154(b) by 398 days.

(21) Appl. No.: 10/570,115

(22) PCT Filed: Aug. 27, 2004

(86) PCT No.: PCT/JP2004/012801

§ 371 (c)(1),
(2), (4) Date: Mar. 1, 2006

(87) PCT Pub. No.: WO2005/021652

PCT Pub. Date: Mar. 10, 2005

(65) Prior Publication Data

US 2007/0009748 A1 Jan. 11, 2007

(30) Foreign Application Priority Data

Sep. 1, 2003 (JP) .............................. 2003-309346

(51) Int. Cl.
*B32B 9/04* (2006.01)
(52) U.S. Cl. .................... 428/448; 428/447; 428/452; 428/480; 525/477; 525/478; 528/15; 528/31; 528/32
(58) Field of Classification Search ...................... None
See application file for complete search history.

(56) References Cited

U.S. PATENT DOCUMENTS

| | | | |
|---|---|---|---|
| 3,527,655 A | | 9/1970 | Ballard |
| 5,082,706 A | * | 1/1992 | Tangney .................... 428/40.7 |
| 6,387,487 B1 | | 5/2002 | Greenberg et al. |
| 6,703,120 B1 | * | 3/2004 | Ko et al. .................. 428/355 R |
| 6,798,467 B2 | | 9/2004 | Tasaki et al. |
| 6,884,314 B2 | * | 4/2005 | Cross et al. .................. 156/329 |
| 2003/0049465 A1 | * | 3/2003 | Kerboua et al. ............. 428/447 |
| 2006/0008662 A1 | * | 1/2006 | Arai et al. .................... 428/447 |
| 2007/0202245 A1 | * | 8/2007 | Gantner et al. ............... 427/2.1 |

FOREIGN PATENT DOCUMENTS

| | | |
|---|---|---|
| EP | 0319839 | 6/1989 |
| EP | 0330850 | 9/1989 |
| JP | 6200159 | 7/1994 |
| JP | 8143834 | 6/1996 |
| JP | 2001200221 | 7/2001 |
| JP | 2002287119 | 10/2002 |
| JP | 2003225972 | 8/2003 |
| WO | WO 00/68336 | * 11/2000 |
| WO | WO02/086911 | * 10/2002 |
| WO | WO 2007/083906 | * 7/2007 |

OTHER PUBLICATIONS

English language abstract for JP6200159 extracted from espacenet.com database, Aug. 10, 2006.
English language abstract for JP8143834 extracted from espacenet.com database, Aug. 10, 2006.
English language abstract for JP2001200221 extracted from espacenet.com database, Feb. 10, 2006.
English language abstract for JP2002287119 extracted from espacenet.com database, Feb. 10, 2006.
English language abstract for JP2003225972 extracted from espacenet.com database, Jan. 28, 2007.

* cited by examiner

*Primary Examiner*—Marc S Zimmer
(74) *Attorney, Agent, or Firm*—Howard & Howard Attorneys PLLC

(57) ABSTRACT

Adhesive silicone elastomer sheet afforded by the cure of a hydrosilylation-curing silicone elastomer composition comprising: (A) an organopolysiloxane that contains at least one diorganosiloxane unit and that has at least two silicon-bonded alkenyl groups in each molecule, (B) an organopolysiloxane resin with the average unit formula: $(R^1_3SiO_{1/2})_x(SiO_{4/2})_{1.0}$ in which $R^1$ is substituted or unsubstituted monovalent hydrocarbon group and x is a number from 0.5 to 1.0, (C) an organopolysiloxane that contains at least two silicon-bonded hydrogen atoms in each molecule, and (D) a hydrosilylation catalyst. The adhesive silicone elastomer sheet is transparent, and whose surface exhibits a stable and permanent adhesiveness.

11 Claims, 2 Drawing Sheets

ADHESIVE SILICONE ELASTOMER SHEET

TECHNICAL FIELD

This invention relates to a hydrosilylation-cured adhesive silicone elastomer sheet that is transparent and whose surface exhibits a stable and permanent adhesiveness.

BACKGROUND ART

It is known that a silicone elastomer sheet, such as a silicone rubber sheet or silicone gel sheet, can be used as the sheet employed to bond a liquid-crystal display panel to a transparent protective sheet therefor with the goal of improving the impact resistance and visibility of small liquid-crystal display devices (e.g., handheld game players and cellular phones), liquid-crystal displays (e.g., for personal computers), and large liquid-crystal display devices (e.g., liquid-crystal televisions). With regard to silicone rubber sheets that exhibit adhesiveness, for example, Japanese Laid-Open (Kokai or Unexamined) Patent Application Number Hei 8-143834 (143834/1996) describes a silicone rubber adhesive sheet in which the following are layered in the sequence given: separator, layer of adhesive, polyethylene terephthalate film, primer layer, and silicone rubber sheet. With regard to silicone gel sheets that exhibit adhesiveness, Japanese Laid-Open (Kokai or Unexamined) Patent Application Number 2001-200221 (200221/2001) describes a silicone gel adhesive sheet in which the following are layered in the sequence given: separator, layer of adhesive, substrate sheet, silicone gel sheet, and separator. With regard to silicone rubber sheets that do not exhibit adhesiveness, Japanese Laid-Open (Kokai or Unexamined) Patent Application Number 2002-287119 (287119/2002) describes a silicone rubber sheet that has a surface roughness (Ra) of 5 μm or less.

The former silicone rubber sheet and the silicone gel sheet have presented the problem of a complex structure because the layer of adhesive is different from the silicone rubber (or gel) layer and the silicone rubber (or gel) layer does not itself exhibit a satisfactory adhesiveness. The latter silicone rubber sheet has presented the problem of a weak adhesiveness.

Within the sphere of silicone elastomer sheet that itself exhibits adhesiveness, Japanese Laid-Open (Kokai or Unexamined) Patent Application Number Hei 6-200159 (200159/1994) describes an adhesive silicone rubber sheet that is afforded by the cure of an organoperoxide-curing silicone rubber composition comprising: 100 parts by weight of a dimethylpolysiloxane that lacks silicon-bonded alkenyl and that has an average degree of polymerization (DP) of 5,000 to 9,000, and 50 to 150 parts by weight of a diorganopolysiloxane that contains at least two silicon-bonded alkenyl in each molecule and that has an average DP of 3,000 to 7,000 that is also lower than the average DP of the above-mentioned dimethylpolysiloxane, and an organoperoxide.

The decomposition residues from the organoperoxide, however, can cause problems in the case of the oraganoperoxide-crosslinked adhesive silicone rubber sheet. While the hydrosilylation reaction does not produce such by-products, hydrosilylation-cured adhesive silicone elastomer sheet whose surface exhibits a stable and permanent adhesiveness has remained unknown.

It is an object of this invention to provide a hydrosilylation-cured adhesive silicone elastomer sheet that is transparent and whose surface exhibits a stable and permanent adhesiveness.

DISCLOSURE OF INVENTION

The adhesive silicone elastomer sheet according to the present invention is characteristically afforded by the cure of a hydrosilylation-curing silicone elastomer composition comprising:

(A) 100 parts by weight of an organopolysiloxane that contains at least one diorganosiloxane unit and that has at least two silicon-bonded alkenyl groups in each molecule, (B) 50 to 150 parts by weight of an organopolysiloxane resin with the average unit formula:

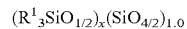

$(R^1_3SiO_{1/2})_x(SiO_{4/2})_{1.0}$ in which $R^1$ is substituted or unsubstituted monovalent hydrocarbon group and x is a number from 0.5 to 1.0, (C) an organopolysiloxane that contains at least two silicon-bonded hydrogen atoms in each molecule, in a quantity sufficient to provide 0.01 to 10 moles silicon-bonded hydrogen atoms in this component per 1 mole of the total alkenyl groups in components (A) and (B), and (D) a hydrosilylation catalyst in a quantity that accelerates curing.

REFERENCE NUMBERS

| | |
|---|---|
| 1 | adhesive silicone elastomer layer |
| 2a, 2b | separator |
| 3a, 3b | film |

DETAILED DESCRIPTION OF THE INVENTION

Figure 1:
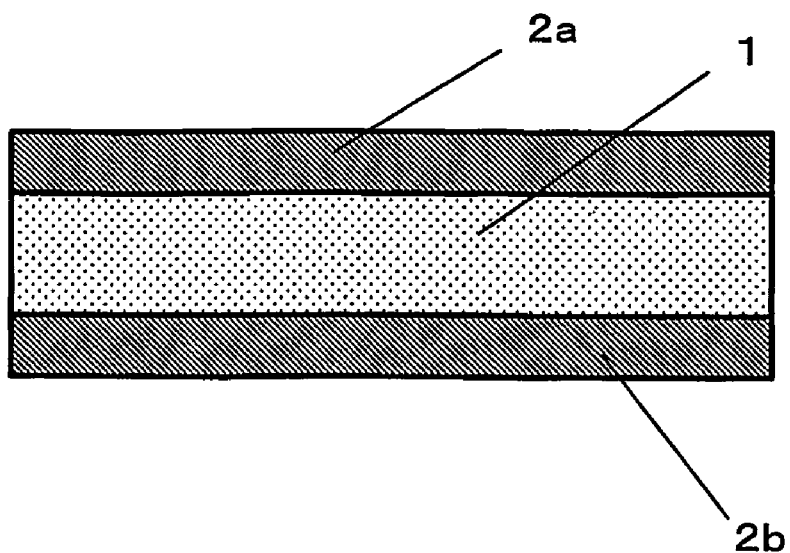
FIG. 1 contains a cross section of an inventive adhesive silicone elastomer sheet that has separators on both surfaces.
Figure 2:
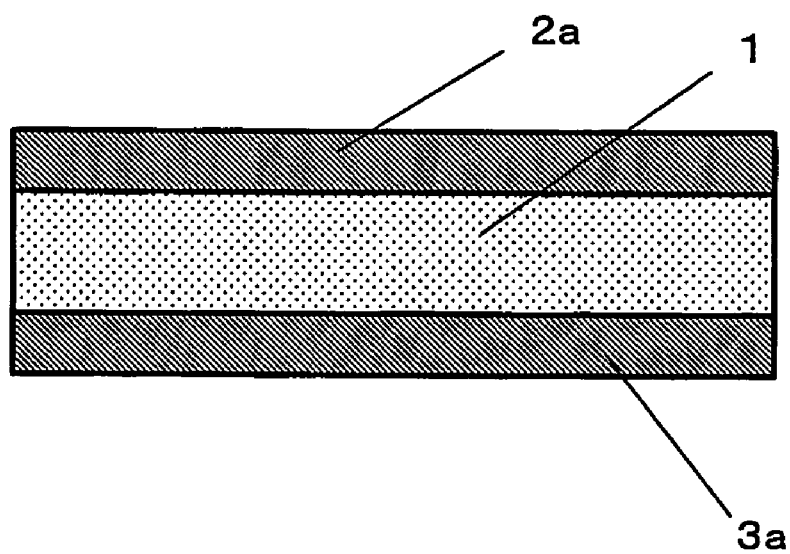
FIG. 2 contains a cross section of an inventive adhesive silicone elastomer sheet that has a separator on one surface and a film on the other surface.
Figure 3:
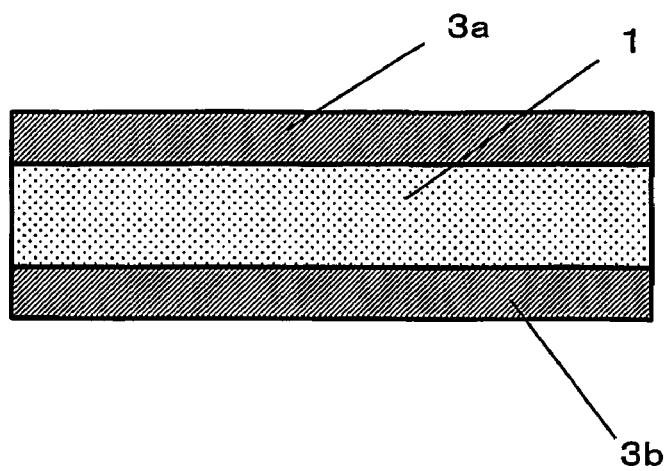
FIG. 3 contains a cross section of an inventive adhesive silicone elastomer sheet that has films on both surface.

The inventive adhesive silicone elastomer sheet will be described in detail with reference to the drawings. The inventive adhesive silicone elastomer sheet comprises an adhesive silicone elastomer layer 1 that intrinsically exhibits adhesiveness, while separators 2a, 2b are preferably disposed on the two surfaces in order to obtain good handling characteristics and prevent dust uptake during storage (see FIG. 1). When the inventive adhesive silicone elastomer sheet is to be bonded to the liquid-crystal display panel or transparent protective sheet therefor and a film inserted between the panel and protective sheet, a separator 2a is preferably disposed on one surface of the adhesive silicone elastomer layer 1 and the aforesaid film 3a is preferably disposed on the other surface (see FIG. 2). When the inventive adhesive silicone elastomer sheet is to be bonded to a film inserted between the liquid-crystal display panel and transparent protective sheet therefor and another film inserted between the liquid-crystal display panel and transparent protective sheet therefor, these films 3a, 3b are preferably disposed on the two surfaces of the adhesive silicone elastomer layer 1 (see FIG. 3). The lower limit on the thickness of the inventive adhesive silicone elastomer sheet is not critical, but in order to obtain good handling characteristics is preferably 0.01 mm and particularly preferably is 0.05 mm. The upper limit on the thickness is preferably 10 mm and particularly preferably is 5 mm. The thickness range for the inventive adhesive silicone elastomer sheet can be selected by freely combining these upper and lower limits and can be specifically exemplified by 0.01 to 10 mm, 0.01 to 5 mm, 0.05 to 10 mm, and 0.05 to 5 mm. The separator functions to prevent dust uptake by the silicone elastomer layer 1 during storage and is peeled off when the inventive adhesive silicone elastomer sheet is put into use. The separator can be specifically exemplified by polyethylene films, polyethylene terephthalate films, polyethersulfone films, fluororesin films, and release paper. The (non-separator) film is used combined with the inventive adhesive silicone elastomer sheet as a single element. This film should be light permeable and is a film that can be used, for example, inserted between the liquid-crystal display panel and the transparent protective sheet therefor. This film can be specifically exemplified by polycarbonate films, cellulose acetate films, and polyethylene terephthalate films. This film may have an adhesive layer on the side opposite the side in contact with the adhesive silicone elastomer sheet. The adhesive silicone elastomer sheet under consideration can be exemplified by adhesive silicone rubber sheets and adhesive silicone gel sheets. Adhesive silicone elastomer sheet is used as a sheet for improving the visibility of small liquid-crystal display devices (e.g., handheld game players and cellular phones), liquid-crystal displays (e.g., for personal computers), and large liquid-crystal display devices (e.g., liquid-crystal televisions), while adhesive silicone gel sheet is preferred in particular because it can improve the impact resistance of liquid-crystal display devices. The hardness of preferred adhesive silicone rubber sheet is no greater than 80 as the type E durometer hardness specified in JIS K 6253, particularly is no greater than 70, more particularly is no greater than 60, and specifically is no greater than 50. The hardness of preferred adhesive silicone gel sheet is at least 20 as the ¼ penetration specified in JIS K 2220.

The adhesive silicone elastomer sheet according to the present invention is characteristically afforded by the cure of a hydrosilylation-curing silicone elastomer composition comprising:
(A) 100 parts by weight of an organopolysiloxane that contains at least one diorganosiloxane unit and that has at least two silicon-bonded alkenyl groups in each molecule,
(B) 50 to 150 parts by weight of an organopolysiloxane resin with the average unit formula:

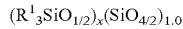

in which $R^1$ is substituted or unsubstituted monovalent hydrocarbon group and x is a number from 0.5 to 1.0,
(C) an organopolysiloxane that contains at least two silicon-bonded hydrogen atoms in each molecule, in a quantity sufficient to provide 0.01 to 10 moles silicon-bonded hydrogen atoms in this component per 1 mole of the total alkenyl groups in components (A) and (B), and
(D) a hydrosilylation catalyst in a quantity that accelerates curing.

The organopolysiloxane (A), which is the base material of the composition under consideration, characteristically contains at least one diorganosiloxane unit and has at least two silicon-bonded alkenyl groups in each molecule. The alkenyl in component (A) can be exemplified by vinyl, allyl, butenyl, pentenyl, hexenyl, and heptenyl and is preferably vinyl. The non-alkenyl Si-bonded organic groups in component (A) can be exemplified by alkyl groups such as methyl, ethyl, propyl, butyl, pentyl, and hexyl; aryl groups such as phenyl, tolyl, and xylyl; and halogenated alkyl groups such as 3-chloropropyl and 3,3,3-trifluoropropyl, and is preferably methyl and/or phenyl. The molecular structure of component (A) is not critical as long as it contains at least one diorganosiloxane unit, i.e., siloxane unit with a general formula $R_2SiO_{2/2}$. As its other siloxane units in component (A) may contain small amounts of siloxane unit with a general formula $R_3SiO_{1/2}$, siloxane unit with a general formula $RSiO_{3/2}$, and siloxane unit with a general formula $SiO_{4/2}$. R in the preceding formulas represents substituted and unsubstituted monovalent hydrocarbon group and can be exemplified by the alkyl, alkenyl, aryl, and halogenated alkyl referenced above. The molecular structure of component (A) can be exemplified by straight chain, branched chain, partially branched straight chain, and dendritic, wherein straight chain, branched chain, and partially branched straight chain are preferred. The viscosity of component (A) at 25° C. is not critical, but is preferably 100 to 1,000,000 mPa·s and more preferably is 100 to 500,000 mPa·s.

Component (A) can be exemplified by dimethylvinylsiloxy-endblocked dimethylpolysiloxanes; dimethylvinylsiloxy-endblocked dimethylsiloxane-methylvinylsiloxane copolymers; trimethylsiloxy-endblocked dimethylsiloxane-methylvinylsiloxane copolymers; branched-chain dimethylpolysiloxane with molecular chain ends terminated by dimethylvinylsiloxy and trimethylsiloxy; trimethylsiloxy-endblocked branched-chain dimethylsiloxane-methylvinylsiloxane copolymers; the organopolysiloxanes afforded by replacing all or part of the methyl in the preceding organopolysiloxanes with alkyl such as ethyl or propyl, aryl such as phenyl or tolyl, or halogenated alkyl such as 3,3,3-trifluoropropyl; the organopolysiloxanes afforded by replacing all or part of the vinyl in the preceding organopolysiloxanes with alkenyl such as allyl or propenyl; and mixtures of two or more of the preceding organopolysiloxanes.

The organopolysiloxane resin (B), which is represented by the following average unit formula, functions to impart adhesiveness to the silicone elastomer sheet afforded by cure of the composition described hereinabove.

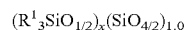

$R^1$ in this formula represents substituted and unsubstituted monovalent hydrocarbon group and can be exemplified by alkyl groups such as methyl, ethyl, propyl, butyl, pentyl, and hexyl; alkenyl groups such as vinyl, allyl, butenyl, pentenyl, hexenyl, and heptenyl; aryl groups such as phenyl, tolyl, and xylyl; and halogenated alkyl groups such as 3-chloropropyl and 3,3,3-trifluoropropyl. $R^1$ is preferably methyl, vinyl, or phenyl, and it is particularly preferred that $R^1$ be entirely methyl. The subscript x in the preceding formula is a number from 0.5 to 1.0 and preferably from 0.5 to 0.9.

A too low component (B) content in the composition runs the risk of a diminished adhesiveness by the silicone elastomer sheet afforded by cure, and for this reason the lower limit on the component (B) content is 50 parts by weight per 100 weight parts component (A) and is preferably 60 parts by weight, more preferably 70 parts by weight, and particularly preferably 80 parts by weight. A too high component (B) content runs the risk of impairing the elastomer properties of the silicone elastomer sheet afforded by cure, and for this reason the upper limit on the component (B) content is 150 parts by weight per 100 weight parts component (A) and is preferably 140 parts by weight, more preferably 130 parts by weight, and particularly preferably 120 parts by weight. The component (B) content in the subject composition per 100 parts by weight component (A) is therefore 50 to 150 parts by weight. Preferred ranges are derived by freely combining these upper and lower limits and can be exemplified by ranges in which the lower limit is raised, such as the ranges of 60 to 150 parts by weight, 70 to 150 parts by weight, and 80 to 150 parts by weight; ranges in which the upper limit is dropped, such as the ranges of 50 to 140 parts by weight, 50 to 130 parts by weight, and 50 to 120 parts by weight; and ranges in which the lower limit is raised and the upper limit is dropped, such as 60 to 140 parts by weight parts and 70 to 130 parts by weight.

The organopolysiloxane (C), which is a curing agent for the composition under consideration, characteristically has at least two silicon-bonded hydrogen atoms in each molecule. The Si-bonded organic groups in component (C) can be exemplified by alkyl groups such as methyl, ethyl, propyl, butyl, pentyl, and hexyl; aryl groups such as phenyl, tolyl, and xylyl; and halogenated alkyl groups such as 3-chloropropyl and 3,3,3-trifluoropropyl. Methyl is preferred for the Si-bonded organic groups in component (C). The molecular structure of component (C) can be, for example, straight chain, branched chain, partially branched straight chain, network, or dendritic. The viscosity of component (C) at 25° C. is not critical, but is preferably 1 to 1,000,000 mPa·s and more preferably is 1 to 10,000 mPa·s.

The organopolysiloxane (C) can be exemplified by trimethylsiloxy-endblocked methylhydrogenpolysiloxanes; trimethylsiloxy-endblocked dimethylsiloxane-methylhydrogensiloxane copolymers; dimethylhydrogensiloxy-endblocked methylhydrogenpolysiloxanes; dimethylhydrogensiloxy-endblocked dimethylsiloxane-methylhydrogensiloxane copolymers; dimethylhydrogensiloxy-endblocked dimethylpolysiloxanes; cyclic methylhydrogenpolysiloxanes; organopolysiloxanes comprising the siloxane unit represented by the formula $(CH_3)_2HSiO_{1/2}$ and the siloxane unit represented by the formula $SiO_{4/2}$; the organopolysiloxanes afforded by replacing all or part of the methyl in the preceding organopolysiloxanes with alkyl such as ethyl or propyl, aryl such as phenyl or tolyl, or halogenated alkyl such as 3,3,3-trifluoropropyl; and mixtures of two or more of the preceding organopolysiloxanes. Based on the good mechanical properties and good adhesiveness thereby generated for the resulting silicone elastomer sheet, the combined use as component (C) of diorganohydrogensiloxy-endblocked diorganopolysiloxane and organohydrogenpolysiloxane or diorganosiloxane-organohydrogensiloxane copolymer is preferred while the combined use of diorganohydrogensiloxy-endblocked diorganopolysiloxane and triorganosiloxy-endblocked organohydrogenpolysiloxane or triorganosiloxy-endblocked diorganosiloxane-organohydrogensiloxane copolymer is particularly preferred.

Component (C) is used in the composition under consideration in a quantity that affords 0.01 to 10 moles, preferably 0.1 to 5 moles, and particularly preferably 0.1 to 3 moles silicon-bonded hydrogen atoms from component (C) per 1 mole of the total alkenyl groups in components (A) and (B). When the component (C) content falls below the lower limit on the aforementioned range, the resulting silicone elastomer composition tends to exhibit an unsatisfactory cure. The mechanical properties and adhesive strength of the resulting silicone elastomer sheet fall off when the component (C) content exceeds the upper limit on the aforementioned range.

The hydrosilylation catalyst (D) is a catalyst that accelerates the cure of the composition under consideration and can be exemplified by platinum catalysts, rhodium catalysts, and palladium catalysts wherein platinum catalysts are preferred. These platinum catalysts can be exemplified by finely divided platinum powder, platinum black, chloroplatinic acid, platinum tetrachloride, alcohol solutions of chloroplatinic acid, olefin complexes of platinum, alkenylsiloxane complexes of platinum, carbonyl complexes of platinum, and the micropowders afforded by dispersing a platinum catalyst as described above in a thermoplastic organic resin such as methyl methacrylate, polycarbonate, polystyrene, or a silicone.

Component (D) is used in the composition under consideration in an amount that accelerates cure of the composition, but its content is not otherwise critical. When, for example, a platinum catalyst is used as component (D), the content of this component preferably provides 0.01 to 500 parts by weight of platinum metal from component (D) per 1,000,000 parts by weight of component (A) and more preferably 0.1 to 100 parts by weight of platinum metal from component (D) per 1,000,000 parts by weight of component (A).

The composition under consideration may contain, within a range in which the transparency and adhesiveness of the silicone elastomer sheet afforded by cure are not impaired, fumed silica, precipitated silica, calcined silica, or powder as afforded by treating the surface of these silica powders with an organosilicon compound such as an organoalkoxysilane, organohalosilane, or organosilazane. The use of silica powder with a BET specific surface area of at least 50 $m^2/g$ is preferred in particular in order to generate a satisfactory mechanical strength and transparency for the silicone elastomer sheet afforded by cure.

The composition under consideration may contain freely selected amounts of silica powder; however, a silica powder content in the range from 0.01 to 10 parts by weight per 100 parts by weight of component (A) is preferred in order to generate a satisfactory transparency and adhesiveness for the resulting silicone elastomer sheet.

The composition under consideration may contain an adhesion promoter in order to improve its adherence. This adhesion promoter can be exemplified by silane coupling agents such as methyltrimethoxysilane, vinyltrimethoxysilane, allyltrimethoxysilane, 3-methacryloxypropyltrimethoxysilane, 3-glycidoxypropyltrimethoxysilane, 3-aminopropyltrimethoxysilane, N-(2-aminoethyl)-3-aminopropyltrimethoxysilane, bis(trimethoxysilyl)propane, and bis(trimethoxysilyl)hexane; titanium compounds such as tetraethyl titanate, tetrapropyl titanate, tetrabutyl titanate, tetra(2-ethylhexyl)titanate, titanium ethylacetonate, and titanium acetylacetonate; aluminum compounds such as (ethyl acetoacetate)aluminumdiisopropylate, aluminumtris(ethyl acetoacetate), (alkyl acetoacetate)aluminumdiisopropylate, aluminumtris(acetylacetonate), and aluminum monoacetylacetonate bis(ethyl acetoacetate); and zirconium compounds such as zirconium acetylacetonate, butoxyzirconium acetylacetonate, zirconium bisacetylacetonate, and zirconium (ethyl acetoacetate). The content of the adhesion promoter is not critical, but is preferably in the range of 0.01 to 10 parts by weight per 100 parts by weight of component (A).

The composition under consideration preferably contains a cure inhibitor in order to improve its storage stability and handling characteristics. This cure inhibitor can be exemplified by acetylenic compounds such as 2-methyl-3-butyn-2-ol, 3,5-dimethyl-1-hexyn-3-ol, and 2-phenyl-3-butyn-2-ol; eneyne compounds such as 3-methyl-3-penten-1-yne and 3,5-dimethyl-3-hexen-1-yne; organosiloxane compounds that contain at least 5 weight % vinyl in the molecule, such as 1,3,5,7-tetramethyl-1,3,5,7-tetravinylcyclotetrasiloxane, 1,3,5,7-tetramethyl- 1,3,5,7-tetrahexenylcyclotetrasiloxane, silanol-endblocked methylvinylsiloxanes, and silanol-endblocked methylvinylsiloxane-dimethylsiloxane copolymers; triazoles such as benzotriazole; phosphines; mercaptans; and hydrazines. The content of the cure inhibitor is not critical, but is preferably in the range of 0.001 to 5 parts by weight per 100 parts by weight of component (A).

The method for curing the above-described composition and fabricating the inventive adhesive silicone elastomer sheet is not critical and can be exemplified by curing the composition while it is sandwiched between two separators. In addition, when the inventive adhesive silicone elastomer sheet will be used to bond film inserted between the liquid-crystal display panel and transparent protective sheet therefor to the panel or protective sheet, the adhesive silicone elastomer sheet can be fabricated by curing the composition with the composition already sandwiched between a separator and the film. When the inventive adhesive silicone elastomer sheet will be used to bond film inserted between the liquid-crystal display panel and transparent protective sheet therefor with another film inserted between the liquid-crystal display panel and transparent protective sheet therefor, the adhesive silicone elastomer sheet can be fabricated by curing the composition with the composition already sandwiched between the two films. The inventive adhesive silicone elastomer sheet can be fabricated using a press vulcanizer and a coater.

EXAMPLES

The inventive adhesive silicone elastomer sheet is described in greater detail in the following through working and comparative examples. The physical properties reported in the examples are the values measured at 25° C. The properties of the adhesive silicone elastomer sheets were measured as follows.

Adhesive Strength

The silicone elastomer sheet molded to a thickness of 0.5 mm was cut to a width of 2 cm and a length of 12 cm and polyethylene terephthalate film with a thickness of 50 μm (Lumirror® of Toray Industries, Inc.) was pressed onto the surface of this silicone elastomer sheet. The adhesive strength was then measured during peeling at 180° and a peel rate of 100 mm/minute.

Hardness

In the case of silicone rubbers, the type E durometer hardness was measured using a type E durometer as specified in JIS K 6253. In the case of silicone gels, the one-quarter penetration specified in JIS K 2220 was measured.

Light Transmittance

The silicone elastomer sheet molded to a thickness of 1 mm was sandwiched between 2 mm-thick glass panels. The light transmittance of this sample was measured using a UV-V spectrophotometer (UV-265FW from Shimadzu). The reference sample, prepared by stacking 2 mm-thick glass panels leaving a 1 mm gap therebetween, had a light transmittance less than 91%.

Practical Example 1

A hydrosilylation-curing silicone rubber composition was prepared by mixing the following to homogeneity:
100 parts by weight of a dimethylvinylsiloxy-endblocked dimethylpolysiloxane with a viscosity of 11,000 mPa·s and a vinyl content of 0.135 weight %;
92.4 parts by weight of an organopolysiloxane resin with the average unit formula:

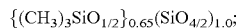

0.4 parts by weight of a trimethylsiloxy-endblocked methylhydrogensiloxane-dimethylsiloxane copolymer with a viscosity of 6 mPa·s and a silicon-bonded hydrogen content of 0.78 weight % (this addition gave 0.62 mole silicon-bonded hydrogen atoms in this methylhydrogensiloxane-dimethylsiloxane copolymer per 1 mole vinyl in the above-referenced dimethylpolysiloxane);
2.3 parts by weight of a dimethylhydrogensiloxy-endblocked dimethylpolysiloxane with a viscosity of 17 mPa·s and a silicon-bonded hydrogen content of 0.12 weight % (this addition gave 0.55 mole silicon-bonded hydrogen atoms in this dimethylpolysiloxane per 1 mole vinyl in the above-referenced dimethylpolysiloxane);
0.19 parts by weight of platinum/1,3-divinyl-1,1,3,3-tetramethyldisiloxane complex; and
0.02 parts by weight of ethynylcyclohexanol.

This silicone rubber composition was sandwiched by a light-releasing polyethylene terephthalate film whose surface had been treated with fluorosilicone (Biwacoat Film KR-30 from Takara Incorporation, thickness=0.05 mm) and was cured by press-molding for 20 minutes at 70° C. to fabricate the adhesive silicone rubber sheet in the prescribed thickness. The adhesive strength and light transmittance of this adhesive silicone rubber sheet are reported in Table 1.

Practical Example 2

A hydrosilylation-curing silicone gel composition was prepared by mixing the following to homogeneity:
100 parts by weight of a trimethylsiloxy-endblocked methylvinylsiloxane-dimethylsiloxane copolymer with a viscosity of 8,000 mPa·s and a vinyl content of 0.3 weight %;
92.4 parts by weight of an organopolysiloxane resin with the average unit formula:

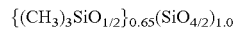

3.6 parts by weight of a dimethylhydrogensiloxy-endblocked dimethylpolysiloxane with a viscosity of 17 mPa·s and a silicon-bonded hydrogen content of 0.13 weight % (this addition gave 0.42 mole silicon-bonded hydrogen atoms in this dimethylpolysiloxane per 1 mole vinyl in the above-referenced methylvinylsiloxane-dimethylsiloxane copolymer);
0.19 parts by weight of platinum/1,3-divinyl-1,1,3,3-tetramethyldisiloxane complex; and
0.03 parts by weight of ethynylcyclohexanol.

This silicone gel composition was sandwiched by a light-releasing polyethylene terephthalate film whose surface had been treated with fluorosilicone (Biwacoat Film KR-30 from Takara Incorporation, thickness=0.05 mm) and was cured by press-molding for 20 minutes at 70° C. to fabricate the adhesive silicone gel sheet in the prescribed thickness. The adhesive strength and light transmittance of this adhesive silicone gel sheet are reported in Table 1.

Practical Example 3

A hydrosilylation-curing silicone gel composition was prepared by mixing the following to homogeneity:
100 parts by weight of a branched chain or partially branched straight chain dimethylpolysiloxane with a viscosity of 800 mPa·s, a vinyl content of 0.26 weight %, and comprising 94.0 mol % of the siloxane unit represented by the formula $(CH_3)_2SiO_{2/2}$, 3.3 mol % of the siloxane unit represented by the formula $CH_3SiO_{3/2}$, 2.0 mol % of the siloxane unit represented by the formula $(CH_3)_3SiO_{1/2}$, and 0.7 mol % of the siloxane unit represented by the formula $(CH_3)_2(CH_2=CH)SiO_{1/2}$;

92.3 parts by weight of an organopolysiloxane resin with the average unit formula:

$$\{(CH_3)_3SiO_{1/2}\}_{0.65}(SiO_{4/2})_{1.0}$$

7.5 parts by weight of a dimethylhydrogensiloxy-endblocked dimethylpolysiloxane with a viscosity of 17 mPa·s and a silicon-bonded hydrogen content of 0.13 weight % (this addition gave 1.0 mole silicon-bonded hydrogen atoms in this dimethylpolysiloxane per 1 mole vinyl in the above-referenced methylvinylsiloxane-dimethylsiloxane copolymer);

0.19 parts by weight of platinum/1,3-divinyl-1,1,3,3-tetramethyldisiloxane complex; and 0.02 parts by weight of ethynylcyclohexanol.

This silicone gel composition was sandwiched by a light-releasing polyethylene terephthalate film whose surface had been treated with fluorosilicone (Biwacoat Film KR-30 from Takara Incorporation, thickness=0.05 mm) and was cured by press-molding for 20 minutes at 70° C. to fabricate the adhesive silicone gel sheet in the prescribed thickness. The adhesive strength and light transmittance of this adhesive silicone gel sheet are reported in Table 1.

Comparative Example 1

A hydrosilylation-curing silicone rubber composition was prepared by mixing the following to homogeneity:

100 parts by weight of a dimethylvinylsiloxy-endblocked dimethylpolysiloxane with a viscosity of 11,000 mPa·s and a vinyl content of 0.135 weight %; 1.5 parts by weight of an organopolysiloxane resin with the average unit formula:

$$\{(CH_3)_3SiO_{1/2}\}_{0.65}(SiO_{4/2})_{1.0}$$

0.43 parts by weight of a trimethylsiloxy-endblocked methylhydrogensiloxane-dimethylsiloxane copolymer with a viscosity of 6 mPa·s and a silicon-bonded hydrogen content of 0.78 weight % (this addition gave 0.67 mole silicon-bonded hydrogen atoms in this methylhydrogensiloxane-dimethylsiloxane copolymer per 1 mole vinyl in the above-referenced dimethylpolysiloxane);

2.56 parts by weight of a dimethylhydrogensiloxy-endblocked dimethylpolysiloxane with a viscosity of 17 mPa·s and a silicon-bonded hydrogen content of 0.12 weight % (this addition gave 0.61 mole silicon-bonded hydrogen atoms in this dimethylpolysiloxane per 1 mole vinyl in the above-referenced dimethylpolysiloxane);

0.20 parts by weight of platinum/1,3-divinyl-1,1,3,3-tetramethyldisiloxane complex; and 0.03 parts by weight of ethynylcyclohexanol.

This silicone rubber composition was sandwiched by a light-releasing polyethylene terephthalate film whose surface had been treated with fluorosilicone (Biwacoat Film KR-30 from Takara Incorporation, thickness=0.05 mm) and was cured by press-molding for 20 minutes at 70° C. to fabricate the adhesive silicone rubber sheet in the prescribed thickness. The adhesive strength of this adhesive silicone rubber sheet is reported in Table 1.

Comparative Example 2

A hydrosilylation-curing silicone gel composition was prepared by mixing the following to homogeneity:

100 parts by weight of a branched chain or partially branched straight chain dimethylpolysiloxane with a viscosity of 800 mPa·s, a vinyl content of 0.26 weight %, and comprising 94.0 mol % of the siloxane unit represented by the formula $(CH_3)_2SiO_{2/2}$, 3.3 mol % of the siloxane unit represented by the formula $CH_3SiO_{3/2}$, 2.0 mol % of the siloxane unit represented by the formula $(CH_3)_3SiO_{1/2}$, and 0.7 mol % of the siloxane unit represented by the formula $(CH_3)_2(CH_2=CH)SiO_{1/2}$;

0.9 parts by weight of an organopolysiloxane resin with the average unit formula:

$$\{(CH_3)_3SiO_{1/2}\}_{0.65}(SiO_{4/2})_{1.0}$$

7.5 parts by weight of a dimethylhydrogensiloxy-endblocked dimethylpolysiloxane with a viscosity of 17 mPa·s and a silicon-bonded hydrogen content of 0.13 weight % (this addition gave 1.0 mole silicon-bonded hydrogen atoms in this dimethylpolysiloxane per 1 mole vinyl in the above-referenced methylvinylsiloxane-dimethylsiloxane copolymer); 0.19 parts by weight of platinum/1,3-divinyl-1,1,3,3-tetramethyldisiloxane complex; and 0.02 parts by weight of ethynylcyclohexanol.

This silicone gel composition was sandwiched by a light-releasing polyethylene terephthalate film whose surface had been treated with fluorosilicone (Biwacoat Film KR-30 from Takara Incorporation, thickness=0.05 mm) and was cured by press-molding for 20 minutes at 70° C. to fabricate the adhesive silicone gel sheet in the prescribed thickness. The adhesive strength of this adhesive silicone gel sheet is reported in Table 1.

TABLE 1

| | Example 1 | Example 2 | Example 3 | Comp. Ex. 1 | Comp. Ex. 2 |
|---|---|---|---|---|---|
| adhesive strength (N/m) | 210 | 42 | 21 | 1.4 | 2.1 |
| type E durometer hardness | 17 | — | — | 33 | — |
| penetration | — | 51 | 80 | — | 120 |
| light transmittance (%) | >98 | >98 | >98 | >98 | >98 |

INDUSTRIAL APPLICABILITY

The inventive adhesive silicone elastomer sheet cures by the hydrosilylation reaction and is therefore free of curing reaction-generated by-products. It is also transparent and its surface exhibits a stable and permanent adhesiveness. As a consequence of these attributes, the inventive adhesive silicone elastomer sheet is well suited for application as the sheet for improving the visibility and impact resistance of small liquid-crystal display devices (e.g., handheld game players and cellular phones), liquid-crystal displays (e.g., for personal computers), and large liquid-crystal display devices (e.g., liquid-crystal televisions).

The invention claimed is:

1. An adhesive silicone elastomer sheet afforded by the cure of a hydrosilylation-curing silicone elastomer composition comprising:

(A) 100 parts by weight of an organopolysiloxane that contains at least one diorganosiloxane unit and that has at least two silicon-bonded alkenyl groups in each molecule, (B) 50 to 150 parts by weight of an organopolysiloxane resin with the average unit formula:

$$(R^1_3SiO_{1/2})_x(SiO_{4/2})_{1.0}$$

in which $R^1$ is substituted or unsubstituted monovalent hydrocarbon group and x is a number from 0.5 to 1.0, (C) an organopolysiloxane that contains at least two silicon-bonded hydrogen atoms in each molecule, in a quantity sufficient to provide 0.01 to 10 moles silicon-bonded hydrogen atoms in this component per 1 mole of the total alkenyl groups in components (A) and (B), and (D) a hydrosilylation catalyst in a quantity that accelerates curing;

wherein the adhesive silicone elastomer sheet comprises a separator on both surfaces, wherein each separator is peelable and each separator independently comprises polycarbonate, polyethersulfone, cellulose acetate, or polyethylene terephthalate.

2. The adhesive silicone elastomer sheet described in claim 1, in which $R^1$ in component (B) is a substituted or unsubstituted monovalent hydrocarbon group that does not contain an aliphatically unsaturated carbon-carbon bond.

3. The adhesive silicone elastomer sheet described in claim 1, that is a silicone rubber sheet or a silicone gel sheet.

4. The adhesive silicone elastomer sheet described in claim 1, having a thickness of 0.01 to 10 mm.

5. An adhesive silicone elastomer sheet afforded by the cure of a hydrosilylation-curing silicone elastomer composition comprising:

(A) 100 parts by weight of an organopolysiloxane that contains at least one diorganosiloxane unit and that has at least two silicon-bonded alkenyl groups in each molecule, (B) 50 to 150 parts by weight of an organopolysiloxane resin with the average unit formula:

$(R^1{}_3SiO_{1/2})_x(SiO_{4/2})_{1.0}$ in which $R^1$ is substituted or unsubstituted monovalent hydrocarbon group and x is a number from 0.5 to 1.0, (C) an organopolysiloxane that contains at least two silicon-bonded hydrogen atoms in each molecule, in a quantity sufficient to provide 0.01 to 10 moles silicon-bonded hydrogen atoms in this component per 1 mole of the total alkenyl groups in components (A) and (B), and (D) a hydrosilylation catalyst in a quantity that accelerates curing;

wherein the adhesive silicone elastomer sheet comprises a film on both surfaces comprising polycarbonate, cellulose acetate, or polyethylene terephthalate.

6. The adhesive silicone elastomer sheet described in claim 5, in which $R^1$ in component (B) is a substituted or unsubstituted monovalent hydrocarbon group that does not contain an aliphatically unsaturated carbon-carbon bond.

7. The adhesive silicone elastomer sheet described in claim 5, that is a silicone rubber sheet or a silicone gel sheet.

8. The adhesive silicone elastomer sheet described in claim 5, having a thickness of 0.01 to 10 mm.

9. A method for bonding a liquid-crystal display panel to a transparent protective sheet for protecting the liquid-crystal display panel, said method comprising the steps of:

providing the liquid-crystal display panel;

providing the transparent protective sheet for protecting the liquid-crystal display panel;

providing an adhesive silicone elastomer sheet comprising:

an adhesive silicone elastomer layer having two surfaces; and a separator disposed on one surface of the adhesive silicone elastomer layer;

wherein the separator is peelable and comprises polycarbonate, polyethersulfone, cellulose acetate, or polyethylene terephthalate; and wherein the adhesive silicone elastomer sheet is afforded by the cure of a hydrosilylation-curing silicone elastomer composition comprising:

(A) 100 parts by weight of an organopolysiloxane that contains at least one diorganosiloxane unit and that has at least two silicon-bonded alkenyl groups in each molecule, (B) 50 to 150 parts by weight of an organopolysiloxane resin with the average unit formula:

$(R^1{}_3SiO_{1/2})_x(SiO_{4/2})_{1.0}$ in which $R^1$ is substituted or unsubstituted monovalent hydrocarbon group and x is a number from 0.5 to 1.0, (C) an organopolysiloxane that contains at least two silicon-bonded hydrogen atoms in each molecule, in a quantity sufficient to provide 0.01 to 10 moles silicon-bonded hydrogen atoms in this component per 1 mole of the total alkenyl groups in components (A) and (B), and (D) a hydrosilylation catalyst in a quantity that accelerates curing;

bonding the liquid-crystal display panel to the adhesive silicone elastomer sheet;

peeling the separator off the adhesive silicone elastomer layer; and bonding the adhesive silicone elastomer layer to the transparent protective sheet.

10. A method for bonding a liquid-crystal display panel or transparent protective sheet for protecting the liquid-crystal display panel to a film inserted between the liquid-crystal display panel and the transparent protective sheet, said method comprising the steps of:

providing the liquid-crystal display panel;

providing the transparent protective sheet for protecting the liquid-crystal display panel;

providing an adhesive silicone elastomer sheet comprising:

an adhesive silicone elastomer layer having two surfaces; and a separator disposed on one surface of the adhesive silicone elastomer layer;

wherein the separator is peelable and comprises polycarbonate, polyethersulfone, cellulose acetate, or polyethylene terephthalate; and wherein the adhesive silicone elastomer sheet layer is afforded by the cure of a hydrosilylation-curing silicone elastomer composition comprising:

(A) 100 parts by weight of an organopolysiloxane that contains at least one diorganosiloxane unit and that has at least two silicon-bonded alkenyl groups in each molecule, (B) 50 to 150 parts by weight of an organopolysiloxane resin with the average unit formula:

$(R^1{}_3SiO_{1/2})_x(SiO_{4/2})_{1.0}$ in which $R^1$ is substituted or unsubstituted monovalent hydrocarbon group and x is a number from 0.5 to 1.0, (C) an organopolysiloxane that contains at least two silicon-bonded hydrogen atoms in each molecule, in a quantity sufficient to provide 0.01 to 10 moles silicon-bonded hydrogen atoms in this component per 1 mole of the total alkenyl groups in components (A) and (B), and (D) a hydrosilylation catalyst in a quantity that accelerates curing;

providing an adhesive layer;

providing a film having two sides and comprising polycarbonate, cellulose acetate, or polyethylene terephthalate;

disposing the adhesive silicone elastomer sheet on one side of the film;

disposing the adhesive layer on the other side of the film;

bonding the liquid-crystal display panel or the transparent protective sheet to the adhesive layer.

11. A method for bonding a film inserted between a liquid-crystal display panel and a transparent protective sheet for protecting the liquid-crystal display panel to another film inserted between the liquid-crystal display panel and the transparent protective sheet, said method comprising the steps of:

providing the liquid-crystal display panel;

providing the transparent protective sheet for protecting the liquid-crystal display panel;

providing a film having two sides and comprising polycarbonate, cellulose acetate, or polyethylene terephthalate;

providing another film having two sides and comprising polycarbonate, cellulose acetate, or polyethylene terephthalate;

providing an adhesive silicone elastomer sheet comprising:

an adhesive silicone elastomer layer having two surfaces; and a separator disposed on one surface of the adhesive silicone elastomer layer;

wherein the separator is peelable and comprises polycarbonate, polyethersulfone, cellulose acetate, or polyethylene terephthalate; and wherein the adhesive silicone elastomer layer is afforded by the cure of a hydrosilylation-curing silicone elastomer composition comprising:

(A) 100 parts by weight of an organopolysiloxane that contains at least one diorganosiloxane unit and that has at least two silicon-bonded alkenyl groups in each molecule, (B) 50 to 150 parts by weight of an organopolysiloxane resin with the average unit formula:

$(R^1_3SiO_{1/2})_x(SiO_{4/2})_{1.0}$ in which $R^1$ is substituted or unsubstituted monovalent hydrocarbon group and x is a number from 0.5 to 1.0, (C) an organopolysiloxane that contains at least two silicon-bonded hydrogen atoms in each molecule, in a quantity sufficient to provide 0.01 to 10 moles silicon-bonded hydrogen atoms in this component per 1 mole of the total alkenyl groups in components (A) and (B), and (D) a hydrosilylation catalyst in a quantity that accelerates curing;

providing two adhesive layers;

disposing the adhesive silicone elastomer sheet on one side of the film;

disposing one adhesive layer on the other side of the film;

bonding the liquid-crystal display panel to the one adhesive layer;

disposing the other adhesive layer on one side of the other film;

bonding the transparent protective sheet to the other adhesive layer;

peeling the separator off the adhesive silicone elastomer sheet; and bonding the adhesive silicone elastomer layer to the other side of the other film.

* * * * *

UNITED STATES PATENT AND TRADEMARK OFFICE
CERTIFICATE OF CORRECTION

PATENT NO. : 7,592,070 B2
APPLICATION NO. : 10/570115
DATED : September 22, 2009
INVENTOR(S) : Takanami et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 603 days.

Signed and Sealed this

Twenty-first Day of September, 2010

David J. Kappos
*Director of the United States Patent and Trademark Office*